United States Patent
Natori (10) Patent No.: US 9,365,754 B2
(45) Date of Patent: Jun. 14, 2016

(54) HEAT-CURING RESIN COMPOSITION, HEAT-CURING ADHESIVE SHEET, AND METHOD FOR PRODUCING HEAT-CURING ADHESIVE SHEET

(75) Inventor: Toshiki Natori, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 30 days.

(21) Appl. No.: 13/824,616

(22) PCT Filed: Nov. 6, 2011

(86) PCT No.: PCT/JP2011/076454
§ 371 (c)(1),
(2), (4) Date: Mar. 18, 2013

(87) PCT Pub. No.: WO2012/073703
PCT Pub. Date: Jun. 7, 2012

(65) Prior Publication Data
US 2013/0183520 A1    Jul. 18, 2013

(30) Foreign Application Priority Data

Dec. 1, 2010  (JP) .................................. 2010-268081

(51) Int. Cl.
*C09J 163/00*  (2006.01)
*C08G 59/40*  (2006.01)
*C08G 59/50*  (2006.01)
(Continued)

(52) U.S. Cl.
CPC ............ *C09J 163/00* (2013.01); *C08G 59/4035* (2013.01); *C08G 59/50* (2013.01); *C09J 7/0203* (2013.01); *C09J 133/068* (2013.01); *C08F 2220/1825* (2013.01); *C08K 5/0025* (2013.01); *C08K 5/17* (2013.01); *C09J 2205/102* (2013.01); *C09J 2433/00* (2013.01); *C09J 2463/00* (2013.01); *Y10T 428/2826* (2015.01)

(58) Field of Classification Search
None
See application file for complete search history.

(56) References Cited

U.S. PATENT DOCUMENTS 5,952,446 A *  9/1999  Krebaum ........................ 528/90
6,448,301 B1 *  9/2002  Gaddam ................... C08F 8/00
                                                  522/113

(Continued)

FOREIGN PATENT DOCUMENTS

JP    A-61-546531    3/1986
JP    A-63-85941     4/1988
(Continued)

OTHER PUBLICATIONS

Machine translation JP 2010-126642 (2010).*
Machine translation JP H09-003021 (1993).*
International Search Report issued in International Application No. PCT/JP2011/076454 on Feb. 21, 2012 (with translation).

*Primary Examiner* — Alexandre Ferre
(74) *Attorney, Agent, or Firm* — Oliff PLC (57) ABSTRACT

The present invention provides a heat-curing resin composition which is curable without UV irradiation or the like and in which exudation of unreacted epoxy resin and the like at the time of pressure thermoforming is satisfactory. The heat-curing resin composition comprises: an acrylic copolymer containing an epoxy group-containing (meth)acrylic ester monomer; an epoxy resin; and a curing agent for the epoxy resin, wherein the curing agent contains organic acid dihydrazide, and part of epoxy groups of the acrylic copolymer are cross-linked by liquid polyamine or liquid polyamidoamine, each having at least one of a primary amino group and a secondary amino group.

11 Claims, 2 Drawing Sheets

(51) Int. Cl.
　　　*C09J 133/06*　　　(2006.01)
　　　*C09J 7/02*　　　(2006.01)
　　　*C08F 220/18*　　　(2006.01)
　　　*C08K 5/00*　　　(2006.01)
　　　*C08K 5/17*　　　(2006.01)

(56) References Cited

U.S. PATENT DOCUMENTS

| 6,673,441 | B1 | 1/2004 | Tanaka et al. |
| 2003/0145949 | A1 | 8/2003 | Tanaka et al. |
| 2010/0014263 | A1 | 1/2010 | Tsuchida et al. |

FOREIGN PATENT DOCUMENTS

| JP | A-1-113476 | 5/1989 |
| JP | A-2-202973 | 8/1990 |
| JP | A-4-332722 | 11/1992 |
| JP | A-4-370996 | 12/1992 |
| JP | 09003021 A * | 1/1997 |
| JP | A-11-181398 | 7/1999 |
| JP | A-2000-159860 | 6/2000 |
| JP | A-2001-220565 | 8/2001 |
| JP | A-2008-111106 | 5/2008 |
| JP | A-2010-126642 | 6/2010 |
| JP | A-2011-79959 | 4/2011 |

* cited by examiner

HEAT-CURING RESIN COMPOSITION, HEAT-CURING ADHESIVE SHEET, AND METHOD FOR PRODUCING HEAT-CURING ADHESIVE SHEET

FIELD OF THE INVENTION

The present invention relates to a heat-curing resin composition comprising an acrylic copolymer, an epoxy resin, and a curing agent for the epoxy resin; a heat-curing adhesive sheet; and a method for producing the heat-curing adhesive sheet. The present application asserts priority rights based on JP Patent Application 2010-268081 filed in Japan on Dec. 1, 2010. The total contents of disclosure of the Patent Application of the senior filing date are to be incorporated by reference into the present Application.

BACKGROUND OF THE INVENTION

In an adhesive material used for Flexible Printed Circuits (hereinafter, referred to as "FPC"), a mixture of an epoxy resin and a curing agent of the epoxy resin is contained as a curing component, and a nitrile-butadiene rubber (hereinafter, referred to as "NBR") or the like is blended in order to improve separation strength of the adhesive material and impart flexibility to the adhesive material. As this NBR, a resin composition containing a carboxyl group capable of being cross-linked to an epoxy resin has been widely used in order to obtain good solder heat resistance (See PTL 1).

Since an adhesive composition used for FPC contains a large amount of an epoxy resin, a large amount of the epoxy resin and the like unreacted exudes at the time of hot-press forming, thereby causing a problem that a drilled portion provided in a cover lay, a reinforcing plate, or the like is plugged.

PTL 2 has proposed a method of preventing an adhesive composition from exuding from a drilled portion by allowing the adhesive composition to contain an ultraviolet (UV) curable resin and irradiating the drilled portion with ultraviolet rays to cure the ultraviolet curable resin.

However, in the technique disclosed in PTL 2, a step of UV irradiation is added, and therefore capital investment for the step of UV irradiation and a special storage condition for avoiding ultraviolet rays during storage are required.

PRIOR-ART DOCUMENTS

Patent Document

PTL 1: Japanese Patent Application Laid-Open No. Hei 04-370996
PTL 2: Japanese Patent Application Laid-Open No. Sho 62-85941

SUMMARY OF THE INVENTION

The present invention is proposed in view of such conventional actual circumstances, and aims at providing a heat-curing resin composition which is curable without UV irradiation or the like and in which exudation of unreacted epoxy resin and the like is satisfactory at the time of hot-press forming; a heat-curing adhesive sheet; and a method for producing the heat-curing adhesive sheet.

A heat-curing resin composition according to the present invention comprises: an acrylic copolymer containing an epoxy group-containing (meth)acrylic ester monomer; an epoxy resin; and a curing agent for said epoxy resin, wherein part of epoxy groups of the above-mentioned acrylic copolymer are cross-linked by liquid polyamine or liquid polyamidoamine, each having at least one of a primary amino group and a secondary amino group.

A heat-curing adhesive sheet according to the present invention is configured such that a heat-curing adhesive layer comprising the above-mentioned heat-curing resin composition is formed on a base film.

A method for producing a heat-curing adhesive sheet according to the present invention comprises: a cross-linking step, wherein an acrylic copolymer dissolved in an organic solvent and containing an epoxy group-containing (meth) acrylic ester monomer is mixed with liquid polyamine or liquid polyamidoamine, each having at least one of a primary amino group and a secondary amino group, whereby part of epoxy groups of said acrylic copolymer are cross-linked by said liquid polyamine or said liquid polyamidoamine; a preparation step, wherein an epoxy resin and a curing agent which is used for said epoxy resin and contains organic acid dihydrazide are dissolved in the organic solvent containing the acrylic copolymer having the cross-linked epoxy group, whereby a coating material for heat-curing adhesive layer formation is prepared; and a heat-curing adhesive layer formation step, wherein the coating material for heat-curing adhesive layer formation is applied on a base film and dried, whereby a heat-curing adhesive layer is formed.

Effects of Invention

According to the present invention, part of epoxy groups of an acrylic copolymer are cross-linked by liquid polyamine or liquid polyamidoamine, each having at least one of a primary amino group and a secondary amino group, whereby exudation of unreacted epoxy resin and the like at the time of hot-press forming can be made satisfactory.

DETAILED DESCRIPTION OF THE INVENTION

Hereinafter, with reference to the drawings, a specific example of an embodiment of a heat-curing resin composition, a heat-curing adhesive sheet, and a method for producing the heat-curing adhesive sheet according to the present invention will be explained in the following order.

1. Heat-curing resin composition
 1-1. Acrylic copolymer
 1-2. Epoxy resin
 1-3. Curing agent
 1-4. Liquid polyamine or liquid polyamidoamine, each having at least one of a primary amino group and a secondary amino group
2. Method for producing heat-curing resin composition
3. Heat-curing adhesive sheet
4. Method for producing heat-curing adhesive sheet
5. Another Embodiment
6. Examples <1. Heat-Curing Resin Composition>

A heat-curing resin composition according to the present embodiment comprises: an acrylic copolymer containing an epoxy group-containing (meth)acrylic ester monomer; an epoxy resin; and a curing agent for the epoxy resin.

<1-1. Acrylic Copolymer>

The acrylic copolymer is to provide film-forming property at the time of film formation and to impart flexibility and toughness to a cured material. The acrylic copolymer is obtained by copolymerizing, for example, an epoxy group-containing (meth)acrylic ester monomer, an acrylonitrile monomer, and an epoxy group-non-containing (meth)acrylic ester monomer.

<Epoxy Group-Containing (Meth)Acrylic Ester Monomer>

The epoxy group-containing (meth)acrylic ester monomer is used to react to the curing agent for the epoxy resin and thereby to form a three-dimensional cross-linkage structure in the cured material of the heat-curing resin composition. The formation of the three-dimensional cross-linkage structure improves moisture resistance and heat resistance of the cured material. For example, even when a reinforcement FPC comprising a reinforcement resin sheet bonded and fixed to a FPC by the cured material of the heat-curing resin composition is soldered (for example, reflow soldering) at not less than 260 degrees C., a blistering phenomenon at the bonding and fixing portion due to moisture absorption can be prevented from occurring.

Such epoxy group-containing (meth)acrylic ester monomer may be suitably selected from monomers used for conventional heat-curable acrylic adhesives applied in the electronic-components field, and used. Examples of the epoxy group-containing (meth)acrylic ester monomer include glycidyl acrylate (GA), and glycidyl methacrylate (hereinafter, referred to as "GMA"). Among these epoxy group-containing (meth)acrylic ester monomers, GMA is preferably used from viewpoints of safety and easy procurement in the market. Note that the epoxy group-containing (meth)acrylic ester monomers may be used alone, or two or more kinds of these may be used in combination.

An amount of the epoxy group-containing (meth)acrylic ester monomer in a total of monomers used for adjusting the acrylic copolymer is preferably 3 to 15% by mass, because when the amount is too small, heat resistance tends to decrease, while when the amount is too large, separation strength tends to decrease.

<Acrylonitrile Monomer>

The acrylonitrile monomer is used for improving heat resistance. Examples of the acrylicnitrile monomer include acrylonitrile and methacrylonitrile. The acrylicnitrile monomers may be used alone, or two or more kinds of these may be used in combination.

An amount of the acrylicnitrile monomer in a total of monomers used for adjusting the acrylic copolymer is preferably 20 to 35% by mass, more preferably 25 to 30% by mass, because when the amount is too small, heat resistance decreases, while when the amount is too large, dissolution of the acrylic copolymer in a solvent becomes difficult.

<Epoxy Group-Non-Containing (Meth)Acrylic Ester Monomer>

The epoxy group-non-containing (meth)acrylic ester monomer may be suitably selected from monomers used for conventional heat-curable acrylic adhesives applied in the electronic-components field, and used. Examples of the epoxy group-non-containing (meth)acrylic ester monomer include methyl acrylate (MA), ethyl acrylate (EA), n-propyl acrylate, n-butyl acrylate, i-butyl acrylate, n-hexyl acrylate, n-octyl acrylate, i-octyl acrylate, 2-ethylhexyl acrylate, i-nonyl acrylate, stearyl acrylate, methyl methacrylate, ethyl methacrylate, n-butyl methacrylate, i-butyl methacrylate, n-hexyl methacrylate, n-octyl methacrylate, i-octyl methacrylate, 2-ethyl hexyl methacrylate, i-nonyl methacrylate, n-dodecyl methacrylate, i-dodecyl methacrylate, and stearyl methacrylate. Among these epoxy group-non-containing (meth)acrylic ester monomers, butyl acrylate and ethyl acrylate are preferably used. These epoxy group-non-containing (meth)acrylic ester monomers may be used alone, or two or more kinds of these may be used in combination.

An amount of the epoxy resin-non-containing monomer in a total of monomers used for adjusting the acrylic copolymer is preferably 60 to 75% by mass, more preferably 65 to 70% by mass, because when the amount is too small, basic characteristics tend to be lowered, while when the amount is too large, heat resistance tends to decrease.

<Weight Average Molecular Weight>

When the weight average molecular weight of the acrylic copolymer is too small, separation strength and heat resistance tend to decrease, while when the weight average molecular weight thereof is too large, solution viscosity tends to increase and thereby to make the application property worse. Accordingly, the weight average molecular weight of the acrylic copolymer is preferably 500,000 to 700,000, more preferably 550,000 to 650,000.

<1-2. Epoxy Resin>

The epoxy resin constituting the heat-curing resin composition is used to form a three-dimensional network structure and to obtain a good adhesive property.

The epoxy resin may be suitably selected from liquid or solid epoxy resins used for conventional heat-curable epoxy resin adhesives applied in the electronic-components field, and used. Examples of the epoxy resin include a bisphenol A type epoxy resin, a bisphenol F type epoxy resin, a bisphenol AD type epoxy resin, a hydrogenated bisphenol A type epoxy resin, a phenol novolak type epoxy resin, a cresol novolak type epoxy resin, polyalkylene polyol (neopentyl glycol or the like) polyglycidyl ether, tetraglycidyldiaminodiphenylmethane, triglycidyl-p-aminophenol, triglycidyl-m-aminophenol, tetraglycidyl-m-xylenediamine, diglycidyl phthalate, diglycidyl hexahydrophthalate, diglycidyl tetrahydrophthalate, vinylcyclohexene dioxide, 3,4-epoxy cyclohexylmethyl(3,4-epoxy cyclohexane)carboxylate, and bis(3,4-epoxy-6-methyl-hexyl-methyl)adipate. These epoxy resins may be used alone, or two or more kinds of these may be used in combination.

An amount of the epoxy resin used is preferably 5 to 30 parts by mass, more preferably 5 to 20 parts by mass with respect to 100 parts by mass of the acrylic copolymer, because when the amount is too small, heat resistance tends to decrease, while when the amount is too large, adhesive properties tend to decrease.

<1-3. Curing Agent>

The heat-curing resin composition contains organic acid dihydrazide as a curing agent for the epoxy resin. The use of organic acid dihydrazide as a curing agent can improve normal-temperature storage performance of the heat-curing resin composition which is solid at normal temperature.

It is preferable that the organic acid dihydrazide has an average particle diameter of 0.5 to 15 μm and is uniformly dispersed. When the organic acid dihydrazide has an average particle diameter of less than 0.5 μm, in the case where an organic solvent for application of the heat-curing resin composition is used, a possibility that organic acid dihydrazide particles may dissolve increases, and thereby there is a risk that the normal temperature storage performance may decrease. When the organic acid dihydrazide has an average particle diameter of more than 15 μm, the performance of applying the heat-curing resin composition decreases, and, due to the large particle size, there is a risk that the organic acid dihydrazide can not be sufficiently mixed with the acrylic polymer and the epoxy resin at the time of melting.

The organic acid dihydrazide may be suitably selected from conventional organic acid dihydrazides used as a curing agent for epoxy resins. Examples of the organic acid dihydrazide include oxalic acid dihydrazide, malonic acid dihydrazide, succinic acid dihydrazide, iminodiacetic acid dihydrazide, adipic acid dihydrazide, pimelic acid dihydrazide, suberic acid dihydrazide, azelaic acid dihydrazide, sebacic acid dihydrazide, dodecanediohydrazide, hexadecanediohydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, 2,6-naphthoic acid dihydrazide, 4,4'-bisbenzene hydrazide, 1,4-naphthoic acid dihydrazide, AJICURE VDH and AJICURE UDH (Product Name, manufactured by Ajinomoto Co., Inc.), citric acid trihydrazide, and 7,11-octadecadiene-1,18-dicarbohydrazide. These organic acid dihydrazides may be used alone, or two or more kinds of these may be used in combination. Among these organic acid dihydrazides, adipic acid dihydrazide or 7,11-octadecadiene-1,18-dicarbohydrazide is preferably used because each of them has a relatively low inciting point and an excellent curing balance, and can be easily procured.

When an amount of the curing agent used is too small, some epoxy groups remain unreacted and cross-linking is insufficiently performed, and therefore heat resistance and adhesive property decrease. On the other hand, when an amount of the curing agent used is too large, an excess of the curing agent remains unreacted, and therefore heat resistance and adhesive property tend to decrease. Accordingly, an amount of the curing agent used is preferably 2 to 15 parts by mass with respect to 100 parts by mass of a total of the acrylic copolymer and the epoxy resin.

<1-4. Liquid Polyamine or Liquid Polyamidoamine, Each Having at Least One of a Primary Amino Group and a Secondary Amino Group>

In the heat-curing resin composition, part of epoxy groups of the acrylic copolymer are cross-linked by liquid polyamine or liquid polyamidoamine, each having at least one of a primary amino group and a secondary amino group. Thus, part of epoxy groups of the acrylic copolymer in the heat-curing resin composition are cross-linked, whereby exudation of the heat-curing resin composition is adjusted to make exudation of unreacted epoxy resin and the like at the time of hot-press forming satisfactory. Here, satisfactory exudation means that, for example, an exudation amount of the unreacted epoxy resin is small at the time of hot-press forming. The polyamine or the polyamidoamine, each having at least one of a primary amino group and a secondary amino group, is preferably liquid because liquid polyamine or liquid polyamidoamine cures the epoxy resin at normal temperature.

Examples of the liquid polyamine or the liquid polyamidoamine, each having at least one of a primary amino group and a secondary amino group, include aliphatic polyamines, such as chain aliphatic polyamine and cyclic aliphatic polyamine. Examples of the chain aliphatic polyamine include diethylenetriamine, triethylene polyamine, tetraethylenepentamine, triethylenetetramine, dipropylenediamine, and diethylaminopropylamine. Examples of the cyclic aliphatic polyamine include menthenediamine and isophoronediamine. Here, polyamine or polyamideamine, each having a tertiary amino group, is not preferably used for the heat-curing resin composition according to the present embodiment, because such polyamine or polyamideamine has a difficulty in the control of a reaction rate in cross-linking, and furthermore has a difficulty in the control of an cross-linking amount since the polyamine or the polyamideamine works on an epoxy resin as an anionic-polymerization type curing agent, thereby causing polymerization of the epoxy resin itself.

In the heat-curing resin composition according to the present embodiment, preferably not less than 1% of epoxy groups of the acrylic copolymer, more preferably 3 to 12% of epoxy groups of the acrylic copolymer are cross-linked by liquid polyamine or liquid polyamidoamine, each having at least one of a primary amino group and a secondary amino group. When less than 1% of epoxy groups of the acrylic copolymer are cross-linked, exudation of unreacted epoxy resin and the like at the time of hot-press forming is not entirely satisfactory. On the other hand, when more than 12% of epoxy groups of the acrylic copolymer are cross-linked, there is no problem with exudation, but curing reaction proceeds too much, thereby causing poor normal-temperature storage performance. Note that it is difficult to precisely measure a ratio of cross-linking of the epoxy group, but, for example, an approximate ratio thereof can be calculated by observing a calorific value measured by DSC (Differential Scanning Calorimetry).

Thus, in the heat-curing resin composition according to the present embodiment, 3 to 12% of epoxy groups of the acrylic copolymer are particularly preferably cross-linked by liquid polyamine or liquid polyamidoamine, each having at least one of a primary amino group and a secondary amino group. In this way, an exudation amount of an adhesive is adjusted, and exudation of unreacted epoxy resin and the like at the time of hot-press forming can be made satisfactory, and moreover, normal-temperature storage performance of films can be made satisfactory over a long period of time.

The heat-curing resin composition according to the present embodiment contains organic acid dihydrazide as a curing agent, thereby having an excellent normal-temperature preservation stability, not needing equipment such as a refrigerator, and making the handling, such as transportation and storage, much easier.

Furthermore, the heat-curing resin composition according to the present embodiment has excellent adhesive strength, and therefore can maintain a high adhesive property to a polyimide film and a metal plate. Also, the heat-curing resin composition according to the present embodiment is excellent in moisture-absorption solder heat-resistance, and therefore, for example, even under high humidity in summer or the like, lead-free reflow soldering resistance at the time of mounting can be made satisfactory.

<2. Method for Producing Heat-Curing Resin Composition>

The heat-curing resin composition according to the present embodiment can be adjusted in such a manner that an acrylic copolymer, an epoxy resin, a curing agent, and liquid polyamine or liquid polyamidoamine, each having at least one of a primary amino group and a secondary amino group, are uniformly mixed using an usual method. Examples of a form of the heat-curing resin composition include a paste form, a film form, and a dispersion liquid form.

The heat-curing resin composition can be manufactured, for example by the following method. An acrylic copolymer dissolved in an organic solvent is mixed with liquid polyamine or liquid polyamidoamine, each having at least one of a primary amino group and a secondary amino group, by using a stirrer, and is allowed to react. After mixing, a predetermined amount of an epoxy resin and a curing agent is fed into this organic solvent, whereby an adhesive solution to be served as the heat-curing resin composition can be produced.

<3. Heat-Curing Adhesive Sheet>

The heat-curing adhesive sheet is configured such that, for example, a heat-curing adhesive layer comprising the abovementioned heat-curing resin composition is formed on a base film (separation base material). Examples of the base film include a polyethylene terephthalate film and a polyimide film. From viewpoints of storage property and handling property in use, the heat-curing adhesive sheet is preferably configured such that 10 to 50 μm in thickness of a heat-curing adhesive layer comprising the heat-curing resin composition is formed on a base film obtained by performing a separation treatment to a polyethylene terephthalate film, a polyimide film, or the like, by using silicone or the like, as needed.

<4. Method for Producing Heat-Curing Adhesive Sheet>

The heat-curing adhesive sheet can be produced, for example by the following method. A method for producing the heat-curing adhesive sheet comprises: a cross-linking step of cross-linking 1 to 15% of epoxy groups of the acrylic copolymer by liquid polyamine or liquid polyamidoamine; a preparation step of preparing a coating material for heat-curing adhesive layer formation; and a heat-curing adhesive layer formation step of forming a heat-curing adhesive layer.

In the cross-linking step, an acrylic copolymer dissolved in an organic solvent and containing an epoxy group-containing (meth)acrylic ester monomer is mixed with liquid polyamine or liquid polyamidoamine, each having at least one of a primary amino group and a secondary amino group. Part of epoxy groups of the acrylic copolymer are thus cross-linked by the liquid polyamine or the liquid polyamidoamine. The above-mentioned compounds may be used as the acrylic copolymer, and the liquid polyamine or the liquid polyamideamine.

In the preparation step, the heat-curing resin composition is fed so as to obtain a viscosity in accordance with an organic solvent, and a curing agent is dispersed in the organic solvent, and the acrylic copolymer and the epoxy resin are dissolved in the organic solvent, whereby a coating material for heat-curing adhesive layer formation is prepared. As the organic solvent, for example, methylethylketone, toluene, or the like may be used. In the preparation step, 70% by mass of all the organic acid dihydrazide particles are preferably dispersed in the coating material for heat-curing adhesive layer formation under room temperature as solid particles. Thus, normal-temperature storage performance of the heat-curing adhesive sheet can be improved.

In the heat-curing adhesive layer formation step, the coating material for heat-curing adhesive layer formation, which is prepared in the preparation step, is applied on a base film by a bar coater, a roll coater, or the like, so as to obtain a heat-curing adhesive layer having a dry thickness of 10 to 50 μM, and dried by an usual method to form a heat-curing adhesive layer. Thus, a heat-curing adhesive layer sheet can be obtained.

The above-mentioned heat-curing resin composition and the above-mentioned heat-curing adhesive sheet are preferably applicable to the electronic-components field, for example. The heat-curing adhesive sheet is particularly preferably applicable in order to bond and fix a terminal portion of a FPC to a reinforcing resin sheet to back the FPC, the reinforcing resin sheet being made of polyethyleneterephthalate, polyimide, glass epoxy, stainless steel, or aluminum, and having a thickness of 50 μm to 2 mm. Thus, there can be obtained a reinforced FPC configured such that a terminal portion of FPC is bonded and fixed to the reinforcing resin sheet, by a heat-curable material of the heat-curing adhesive layer except the base film of the curing adhesive layer sheet according to the present embodiment.

<5. Another Embodiment>

In the heat-curing resin composition according to the present embodiment, besides the above-mentioned components, well-known additives, such as a metal deactivator, an antifoaming agent, a rust preventive, and a dispersant, which do not accelerate dissolution of the organic acid dihydrazide, may be blended within the range of not impairing advantageous effects of the present invention, as needed.

<Examples>

Hereinafter, specific examples according to the present invention will be explained. Note that the present invention is not limited to the following examples.

(Material)

Acrylic copolymer
    Butyl acrylate (BA), Ethyl acrylate (EA), Acrylonitrile (AN), Glycidyl methacrylate (GMA)

Epoxy resin
    JER828, JER1001

Curing agent
    4,4¹-diaminodiphenylsulfone (DDS),
    7,11-octadecadiene-1,18-dicarbohydrazide (UDH)

Liquid polyamine or Liquid polyamidoamine, each having at least one of a primary amino group and a secondary amino group.
    Mixture of triethylenetetramine, and a denatured material thereof Carboxyl group-containing NSR
    Nipol 1072J (Preparation of Coating Material for Heat-Curing Adhesive Layer Formation)

An acrylic copolymer comprising monomers shown in Table 1 was prepared. The acrylic copolymer dissolved in an organic solvent and a mixture of triethylenetetramine and a denatured material thereof were measured and taken so as to obtain a composition shown in Table 1, and then, while being mixed by a stirrer, were allowed to react for 2 hours, whereby part of epoxy groups of the acrylic copolymer were cross-linked by the mixture of triethylenetetramine and the denatured material thereof. After mixing, a predetermined amount of an epoxy resin and a curing agent was fed to produce a coating material for heat-curing adhesive layer formation (adhesive solution), the coating material having a composition shown in Table 1. Note that, in Comparative Example 1, the mixture of triethylenetetramine and the denatured material thereof was not mixed.

(Production of Heat-Curing Adhesive Sheet)

The obtained coating material for heat-curing adhesive layer formation was applied to a separation-treated polyethylene terephthalate film, and dried in a drying furnace at 50 to 130 degrees C. to form a heat-curing adhesive layer having a thickness of 35 μm, whereby a heat-curing adhesive sheet was produced.

TABLE 1

| | | | Comparative Example 1 | Example 1 | Example 2 | Example 3 | Example 4 | Example 5 |
|---|---|---|---|---|---|---|---|---|
| Carboxyl Group-containing NBR (Nipol 1072J) (parts by mass) | | | 100 | | | | | |
| Acrylic Copolymer | Composition | BA(parts by mass) | | 56.0 | 56.0 | 51.0 | 55.0 | 38.0 |
| | | EA(parts by mass) | | 13.0 | 13.0 | 13.0 | 13.0 | 29.7 |

TABLE 1-continued

|  |  | Comparative Example 1 | Example 1 | Example 2 | Example 3 | Example 4 | Example 5 |
|---|---|---|---|---|---|---|---|
|  | AN(parts by mass) |  | 26.0 | 26.0 | 26.0 | 26.0 | 29.3 |
|  | GMA(parts by mass) |  | 5.0 | 5.0 | 10.0 | 6.0 | 3.0 |
| Epoxy Resin | JER828(parts by mass) | 50 | 15.0 | 12.0 | 8.0 | 12.0 | 15.0 |
|  | JER1001(parts by mass) | 50 |  |  |  |  |  |
| Curing Agent for Epoxy Resin | DDS(parts by mass) | 15 |  |  |  |  |  |
|  | UDH(parts by mass) |  | 14 | 10 | 12 | 14 | 16 |
|  | Average particle diameter(μm) |  | 2 | 2 | 2 | 2 | 2 |
| Actual Blended Amount of Primary or Secondary Liquid Amine (parts by mass) |  |  | 0.005 | 0.22 | 0.08 | 0.12 | 0.09 |
| Cross-linking Ratio of Epoxy Group in Acrylic Rubber (%) |  |  | 0.5 | 18 | 3 | 8 | 12 |
| Adhesive Exudation |  | x | Δ | ○ | ○ | ○ | ○ |
| Separation Strength (N/cm) Between Polyimide and Polyimide | Initial Stage | 9 | 25 | 26 | 28 | 24 | 20 |
|  | 25 degrees C/3 months later | 6 | 26 | 17 | 28 | 25 | 19 |
| Moisture absorption Reflow Soldering Heat-Resistance 260 degrees C × 30 sec. | Initial Stage | A | A | A | A | A | A |
|  | 25 degrees C/3 months later | C | A | C | A | A | A |
| Normal-Temperature Storage Performance |  | x | ○ | x | ○ | ○ | ○ |

In Table 1, "BA" represents butyl acrylate, "EA" represents ethyl acrylate, "AN" represents acrylonitrile, "GMA" represents glycidyl methacrylate, "DDS" represents 4,4'-diaminodiphenyl sulfone, and "UDH" represents 7,11-octadecadiene-1,18-dicarbohydrazide. Also, in Table 1, the unit of a blended amount of each of the acrylic copolymer, the epoxy resin, the curing agent, a primary or secondary liquid amine, and carboxyl group-containing NBR is parts by mass.

In Table 1, "Actual Blended Amount of Primary or Secondary Liquid Amine" represents an amount of triethylenetetramine and a denatured material thereof actually added (parts by mass).

In Table 1, "Cross-linking Ratio of Epoxy Group in Acrylic Rubber" represents a cross-linking ratio (%) of epoxy groups of an acrylic copolymer, the epoxy groups being cross-linked by a mixture of triethylenetetramine and a denatured material thereof.

(Evaluation of Exudation Properties)

Figure 1A:
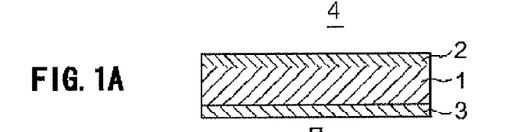
FIG. 1A to FIG. 1G illustrate a process chart for explaining a method of producing a test specimen.
Figure 1B:
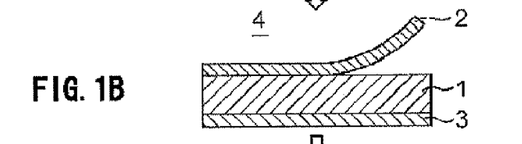
Figure 1C:
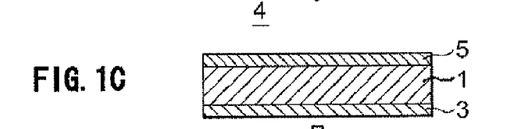
Figure 1D:
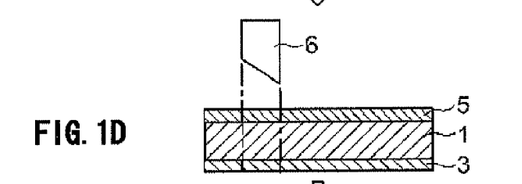
Figure 1E:
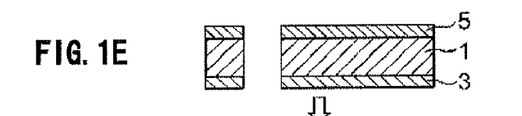
Figure 1F:
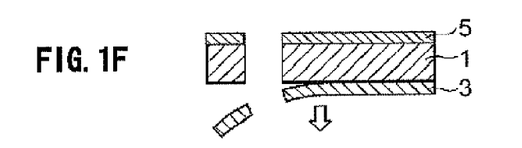
Figure 1G:
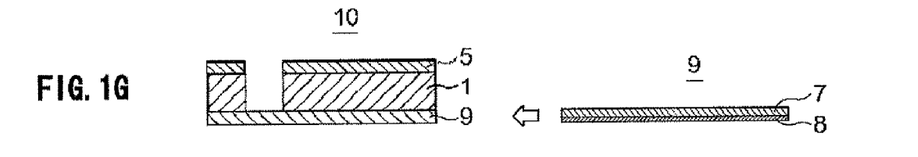
Figure 2:
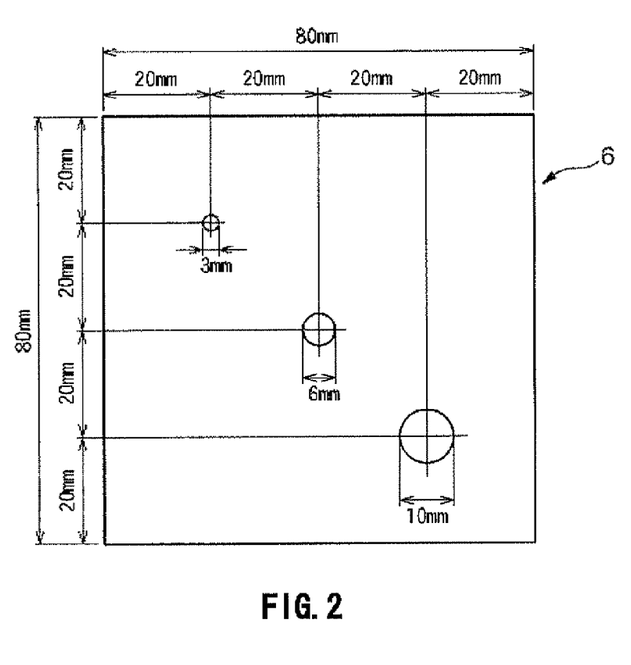
FIG. 2 is a plan view schematically illustrating an example of a Victoria die in a method of measuring exudation properties.
Figure 3:
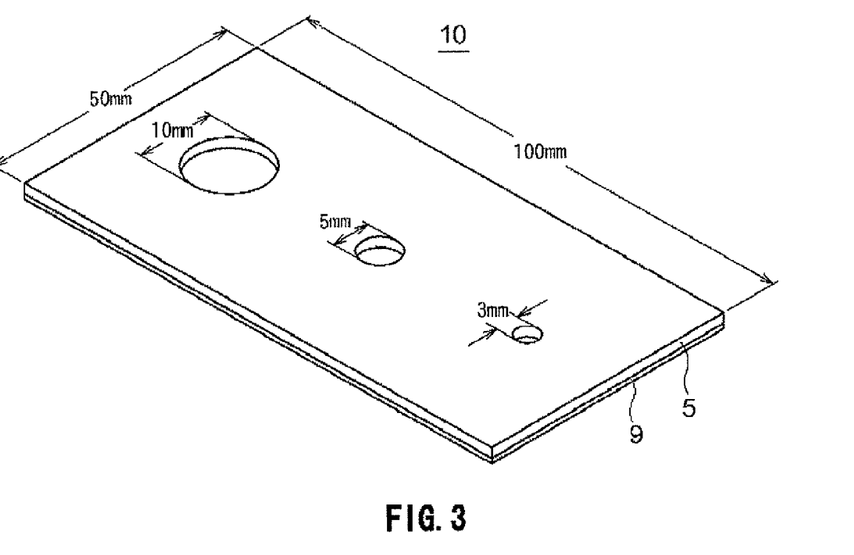
FIG. 3 is a perspective view schematically illustrating an example of a test specimen for measuring exudation.

Exudation properties were evaluated as follows. As illustrated in FIG. 1A, there was prepared an adhesive sheet 4 made into a double separation (double side separation) type, wherein a light separating type separation film (hereinafter, referred to as "light surface side film") 2 and a heavy separating type separation film (hereinafter, referred to as "heavy surface side film") 3 were provided on each surface of a heat-curing adhesive layer 1 in a 35 μm-thick film form, respectively. As illustrated in FIG. 1B, the light surface side film 2 of the adhesive sheet 4 was separated, and then, as illustrated in FIG. 1C, laminated on a 175 μm-thick polyimide film 5 under conditions of 100 degrees C., 1 m/min, and 5 kg/cm. As illustrated in FIG. 1D and FIG. 1E, the adhesion sheet 4 laminated on the polyimide film 5 was punched from the side of the polyimide film 5 by using a Victoria die 6 illustrated in FIG. 2. As illustrated in FIG. 1F, the heavy surface side film 3 of a sample of the adhesion sheet 4 which was punched from the side of the polyimide film 5 was separated, and then CCL (copper clad laminate) 9 comprising of copper 7 and a polyimide film 8 was laminated. Thus, a test specimen 10 was produced. As illustrated in FIG. 1G and FIG. 3, the test specimen 10 has a 50 mm short side and a 100 mm long side, and holes for measurement of exudation properties, each respectively having a diameter of 10 mm, a diameter of 5 mm, and a diameter of 3 mm, were formed in the transverse direction (thickness direction) of the test specimen 10.

Exudation properties were measured in such a manner that the test specimen 10 was pressed at 170 degrees C. and 2 MPa for 1 minute, and an amount of the heat-curing adhesive layer 1 exuded from the die-punched section after the press was measured by an optical microscope. Measurement results of exudation properties are shown in Table 1. In Table 1, exudation properties evaluated to be "○" represent that an extrusion width of the heat-curing adhesive layer 1 exuded from the holes provided in the test specimen 10 is 50 to 100 μm. Exudation properties evaluated to be "Δ" represent that an extrusion width of the heat-curing adhesive layer 1 exuded from the holes provided in the test specimen 10 is 100 to 200 μm. Exudation properties evaluated to be "x" represent that an extrusion width of the heat-curing adhesive layer 1 exuded from the holes provided in the test specimen 10 is not less than 200 μm.

(Evaluation of Separation Strength)

Separation strength was evaluated as follows. The heat-curing adhesive sheet immediately after obtained was cut into a strip having a predetermined size (5 cm×10 cm), and the heat-curing adhesive layer was temporarily laminated to a 175 μm-thick polyimide film (175AH, manufactured by Kaneka Corporation) by a laminator set at 80 degrees C., and then, a base film was removed to expose the heat-curing adhesive layer. A 50 μm-thick polyimide film (200H, manufactured by E. I. du Pont de Nemours & Company) having the same size as the exposed heat-curing adhesive layer was laminated from above to the exposed heat-curing adhesive layer, and heat-pressed at 170 degrees C. and 2.0 MPa for 60 seconds, and then held in an oven at 140 degrees C. for 60 minutes.

A heat-curing adhesive layer which was obtained by cutting the heat-curing adhesive sheet into a strip (5 cm×10 cm) was pressed and temporarily laminated to a 0.5 mm-thick SUS304 plate or a 1 mm-thick glass epoxy plate, and then, a base film was removed to expose the heat-curing adhesive layer. A 50 μm-thick polyimide film in a strip form (5 cm×10 cm) was laminated from above to the exposed heat-curing adhesive layer, and heat-pressed at 170 degrees C. and 2.0 MPa for 60 seconds, and then held in an oven at 140 degrees C. for 60 minutes.

After the holding in the oven, a 90-degree separation test was carried out on the polyimide film at a separation rate of 50 mm/min to measure the strength necessary to peel off the polyimide film. Table 1 shows measurement results. Separation strength is practically desired to be 10 N/cm.

(Moisture-Absorption Reflow Soldering Heat-Resistance Test)

A moisture-absorption reflow soldering heat-resistance test was carried out as follows. A heat-curing adhesive layer which was obtained by cutting the heat-curing adhesive sheet into a strip (2 cm×2 cm) was temporarily laminated to a 175 μm-thick polyimide film (APICAL 175AH, manufactured by Kaneka Corporation) by a laminator set at 80 degrees C. A separation base material was removed from the heat-curing adhesive sheet to expose the heat-curing adhesive layer. A 50 μm-thick polyimide film (Kapton 200H, manufactured by E. I. du Pont de Nemours & Company) having the same size as the exposed heat-curing adhesive layer was laminated from above to the exposed heat-curing adhesive layer, and heat-pressed at 170 degrees C. and 2.0 MPa for 60 seconds, and then held in an oven at 140 degrees C. for 60 minutes. The heat-cured test specimen was left to stand in an oven at 40 degrees C. and 90% RH for 96 hours.

The specimen immediately after the moist heat treatment was made to pass through a reflow furnace set at a top temperature of 260 degrees C. for 30 seconds, and visually observed to check whether or not the test specimen after passing-through had an abnormality in appearance, such as separation or blistering. Table 1 shows observation results. In Table 1, moisture-absorption reflow soldering heat-resistance evaluated to be "A" represents a case where there was no problem in appearance. Moisture-absorption reflow soldering heat-resistance evaluated to be "C" represents a case where blistering due to foaming was observed in the test specimen.

(Normal-Temperature Storage Performance)

Normal-temperature storage performance was evaluated as follows. In Table 1, normal-temperature storage performance evaluated to be "○" represents a case where a decreasing rate of separation strength with respect to initial separation strength is not more than 30% and also there is no variation in moisture-absorption reflow soldering properties. Normal-temperature storage performance evaluated to be "x" represents a case where a decreasing rate of separation strength with respect to initial separation strength is not less than 30%, or there is a variation in moisture-absorption reflow soldering properties.

In each of the heat-curing adhesive sheet obtained in Example 1 to Example 5, 0.5 to 18% of epoxy groups of an acrylic copolymer were cross-linked by a mixture of triethylenetetramine and a denatured material thereof. Accordingly, each of the heat-curing adhesive sheet obtained in Example 1 to Example 5 was satisfactory in exudation of unreacted epoxy resin and the like at the time of hot-press forming.

Particularly, in each of the heat-curing adhesive sheet obtained in Example 3 to Example 5, organic acid dihydrazide was included in the heat-curing adhesive layer, and 3 to 12% of epoxy groups of an acrylic copolymer were cross-linked by a mixture of triethylenetetramine and a denatured material thereof. Accordingly, each of the heat-curing adhesive sheet obtained in Example 3 to Example 5 was evaluated to be satisfactory in all respects of exudation of unreacted epoxy resin and the like at the time of hot-press forming, normal-temperature storage performance of the film, separation strength, and test results of moisture-absorption reflow soldering heat-resistance.

In the heat-curing adhesive sheet obtained in Comparative Example 1, organic acid dihydrazide was not included in a heat-curing adhesive layer, and part of epoxy groups of an acrylic copolymer were not cross-linked by liquid polyamine or liquid polyamidoamine, each having at least one of a primary amino group and a secondary amino group. Accordingly, the heat-curing adhesive sheet obtained in Comparative Example 1 was evaluated to be unsatisfactory in all respects of exudation of unreacted epoxy resin and the like at the time of heat-press forming, normal-temperature storage performance of the film, separation strength, and test results of moisture-absorption reflow soldering heat-resistance.

The invention claimed is:

1. A heat-curing resin composition for producing a heat-curing adhesive sheet on a base film, comprising:
    an acrylic copolymer containing an epoxy group-containing (meth)acrylic ester monomer;
    an organic solvent;
    an epoxy resin; and
    a curing agent comprising organic acid dihydrazide for said epoxy resin,
    wherein 3 to 12% of the epoxy groups of the acrylic copolymer are cross-linked by a liquid polyamine or a liquid polyamidoamine before forming as a heat-curing adhesive sheet, each having at least a primary amino group or a secondary amino group, and
    wherein an amount of the epoxy resin used is 5 to 30 parts by mass with respect to 100 parts by mass of the acrylic copolymer.

2. The heat-curing resin composition according to claim 1, wherein a blend ratio of the epoxy group-containing (meth) acrylic ester monomer is 3 to 15% by mass with respect to the acrylic copolymer.

3. The heat-curing resin composition according to claim 2, wherein the organic acid dihydrazide has an average particle diameter of 0.5 to 15 μm and is uniformly dispersed.

4. A heat-curing adhesive sheet, wherein a heat-curing adhesive layer comprising the heat-curing resin composition according to claim 3 is formed on a base film.

5. A heat-curing adhesive sheet, wherein a heat-curing adhesive layer comprising the heat-curing resin composition according to claim 2 is formed on a base film.

6. The heat-curing resin composition according to claim 1, wherein the organic acid dihydrazide has an average particle diameter of 0.5 to 15 μm and is uniformly dispersed.

7. A heat-curing adhesive sheet, wherein a heat-curing adhesive layer comprising the heat-curing resin composition according to claim 6 is formed on a base film.

8. A heat-curing adhesive sheet, wherein a heat-curing adhesive layer comprising the heat-curing resin composition according to claim 1 is formed on a base film.

9. The heat-curing resin composition according to claim 1, wherein:
    an amount of the epoxy resin used is 5 to 30 parts by mass with respect to 100 parts by mass of the acrylic copolymer;
    an amount of the organic acid dihydrazide used is 2 to 15 parts by mass with respect to 100 parts of a total mass of the acrylic copolymer and the epoxy resin; and
    an amount of the epoxy group-containing (meth)acrylic ester monomer in a total mass of monomers used for adjusting the acrylic copolymer is 3 to 15% by mass.

10. The heat-curing resin composition according to claim 1, wherein the weight average molecular weight of the acrylic copolymer is 500,000 to 700,000.

11. A method for producing a heat-curing adhesive sheet using the heat-curing resin composition, comprising:
- a cross-linking step, wherein an acrylic copolymer dissolved in an organic solvent and containing an epoxy group-containing (meth)acrylic ester monomer is mixed with liquid polyamine or liquid polyamidoamine, each having at least one of a primary amino group and a secondary amino group, whereby part of epoxy groups of said acrylic copolymer are cross-linked by said liquid polyamine or said liquid polyamidoamine;
- a preparation step, wherein an epoxy resin and a curing agent for said epoxy resin, the curing agent containing organic acid dihydrazide, are dissolved in the organic solvent containing the acrylic copolymer having the cross-linked epoxy groups, whereby a coating material for heat-curing adhesive layer formation is prepared; and
- a heat-curing adhesive layer formation step, wherein the coating material for heat-curing adhesive layer formation is applied on a base film and dried, whereby a heat-curing adhesive layer is formed.

* * * * *